(12) United States Patent
Koh

(10) Patent No.: US 8,705,186 B2
(45) Date of Patent: Apr. 22, 2014

(54) BARREL DRIVING SYSTEM AND BACKLASH CORRECTION METHOD THEREOF

(75) Inventor: Hong-Bin Koh, Taipei (TW)

(73) Assignee: Altek Corporation, Hsinchu (TW)

(*) Notice: Subject to any disclaimer, the term of this patent is extended or adjusted under 35 U.S.C. 154(b) by 181 days.

(21) Appl. No.: 13/430,252

(22) Filed: Mar. 26, 2012

(65) Prior Publication Data
US 2013/0141805 A1 Jun. 6, 2013

(51) Int. Cl.
*G02B 7/02* (2006.01)
(52) U.S. Cl.
USPC ............................................. 359/823
(58) Field of Classification Search
USPC ............................................. 359/824
See application file for complete search history.

(56) References Cited

U.S. PATENT DOCUMENTS 5,905,918 A * 5/1999 Nakamura et al. .............. 396/87

* cited by examiner

*Primary Examiner* — James Jones
(74) *Attorney, Agent, or Firm* — Muncy, Geissler, Olds & Lowe, PLLC

(57) ABSTRACT

The patent discloses a lens barrel driving system and a backlash correction method thereof. In such system, a zoom photo-interrupter (PI) is used to detect the movement of a zooming barrel and generate a first count value. The movement of a focusing barrel corresponds to the movement of the zooming barrel, so that when the zooming barrel is driven to move from an initial position to a first zooming position or from the first zoom position to a second zoom position, the focusing barrel moves correspondingly and its movement triggers a home PI to generate a second count value. Upon the generation of the second count value, a predetermined value is used to replace the first count value so as to correct the error caused by backlash of lens barrels.

10 Claims, 7 Drawing Sheets

BARREL DRIVING SYSTEM AND BACKLASH CORRECTION METHOD THEREOF

CROSS-REFERENCE TO RELATED APPLICATION

This application claims the benefit of Taiwan Patent Application No. 100144751, filed on Dec. 6, 2011, in the Taiwan Intellectual Property Office, the disclosure of which is incorporated herein in its entirety by reference.

BACKGROUND OF THE INVENTION

1. Field of the Invention

The present invention relates generally to a barrel driving system, more particularly, relates to a barrel driving system capable of correcting backlash of zooming system.

2. Description of the Related Art

A zooming barrel structure has multiple barrel sets comprising a driving barrel, a zooming barrel and a focusing barrel, and these barrels have substantially cylinder structures. A first guiding groove and a second guiding groove are arranged in the inner wall of the driving barrel, and a first guiding protrusion is arranged on the outer wall of the zooming barrel, and a second guiding protrusion is arranged on the outer wall of the focusing barrel. During fabrication of the zooming barrel structure, the zooming barrel and the focusing barrel are assembled inside the driving barrel, and the first guiding protrusion is placed into the first guiding groove, and the second guiding protrusion is placed into the second guiding groove.

When the driving barrel is driven to rotate by a motor, the first guiding protrusion and the second guiding protrusion are forced to move along the first guiding groove and the second guiding groove respectively, so that the zooming barrel and the focusing barrel can be moved forward or backward correspondingly along an optical axis. A zooming lens group and a focusing lens group are arranged in the zooming barrel and the focusing barrel respectively. Therefore, a zooming operation and a focusing operation can be performed upon the forward or backward movement of zooming barrel and focusing barrel driven by the clockwise or counterclockwise rotation of the driving barrel controlled by the motor.

In order to check whether the barrel is moved to the correct position, a zoom photo-interrupter (PI) and a home PI are arranged in the zooming barrel structure for position detection. The zoom PI detects the rotation of the motor and a count value is generated upon the detection results. According to the count value, the distance of rotation of the motor can be calculated to derive the actual position of the barrel. The home PI is used to position the initial position of the barrel to prevent an image sensor from being impacted by the barrel while retracting.

For smooth movement of the guiding protrusion in the guiding groove, there is no tight fit between the guiding protrusion and the guiding groove, but a backlash exists. However, the backlash will cause an error between the count value and the actual position of the barrel after the barrel is driven to move forward and backward for many times, and such error decreases the accuracy of the zooming operation and the focusing operation.

SUMMARY OF THE INVENTION

Therefore, an object of the present invention is to provide a barrel driving system and a backlash correction method thereof, so as to correct the backlash of a barrel using a single home photo-interrupter.

The object of the present invention can be achieved by providing a barrel driving system which comprises a driving module, a zooming barrel, a first position detection unit, a first register, a second position detection unit, a focusing barrel, a second register, a storage unit and a processing unit. The zooming barrel is controlled by the driving module to move to an initial position, a first zooming position or a second zooming position. The first position detection unit detects the driving module and outputs a first detection signal. The first register stores a first count value according to the first detection signal. The focusing barrel is moved by being controlled through the driving module, wherein the focusing barrel is moved correspondingly to the zooming barrel so that the focusing barrel triggers the second position detection unit to generate a second detection signal when the zooming barrel moves from the initial position to the first zooming position or from the first zooming position to the second zooming position respectively. The second register stores a second count value according to the second detection signal. The storage unit stores a lookup table which records multiple predetermined values and the second count values corresponding to the predetermined values. When the second position detection unit is triggered, the processing unit reads the predetermined value corresponding to the second count value from the storage unit, and stores the predetermined value in the first register to replace the first count value stored in the first register.

Preferably, the zooming barrel further moves to a third zooming position, and the focusing barrel triggers the second position detection unit to generate the second detection signal when the zooming barrel moves from the second zooming position to the third zooming position.

Preferably, the first zooming position is a WIDE position, the second zooming position is a MID position, and the third zooming position is a TELE position.

Preferably, a position where the focusing barrel triggers the second position detection unit is between a zooming completion position and a focusing starting position.

Preferably, the first position detection unit is a zoom PI, and the second position detection unit is a home PI.

Preferably, the predetermined value, which is corresponding to the second detection signal outputted by the second position detection unit triggered while the zooming barrel moves from the initial position to the first zooming position, is 0.

The object of the present invention can be achieved by providing a backlash correction method which is applied to a barrel driving system comprising a zooming barrel, a focusing barrel and a driving module controlling movements of the zooming barrel and the focusing barrel. The zooming barrel is moved to an initial position, a first zooming position and a second zooming position. The movement of the focusing barrel corresponds to the movement of the zooming barrel. The backlash correction method comprises the following steps. A first position detection unit is used to detect the driving module for outputting a first detection signal, and a first register is used to count and store a first count value according to the first detection signal. A second position detection unit is used to generate a second detection signal while the second position detection unit is triggered during the movement of the zooming barrel from the initial position to the first zooming position or from the first zooming position to the second zooming position respectively. A second register is used to count and store a second count value according to the second detection signal. Multiple predetermined values corresponding to the plurality of second count values are provided. One of the predetermined values corresponding to the second count value is determined when the second position detection unit is triggered, and the determined predetermined value is then stored in the first register to replace the first count value stored in the first register.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE PREFERRED EMBODIMENTS

In the following detailed description, reference is made to the accompanying drawing figures which form a part hereof, and which shows by way of illustration specific embodiments of the present invention. It is to be understood by those of ordinary skill in the art that other embodiments may be utilized, and structural, electrical, as well as procedural changes may be made without departing from the scope of the present invention. Wherever possible, the same reference numbers will be used throughout the drawings to refer to the same or similar parts.

Figure 1:
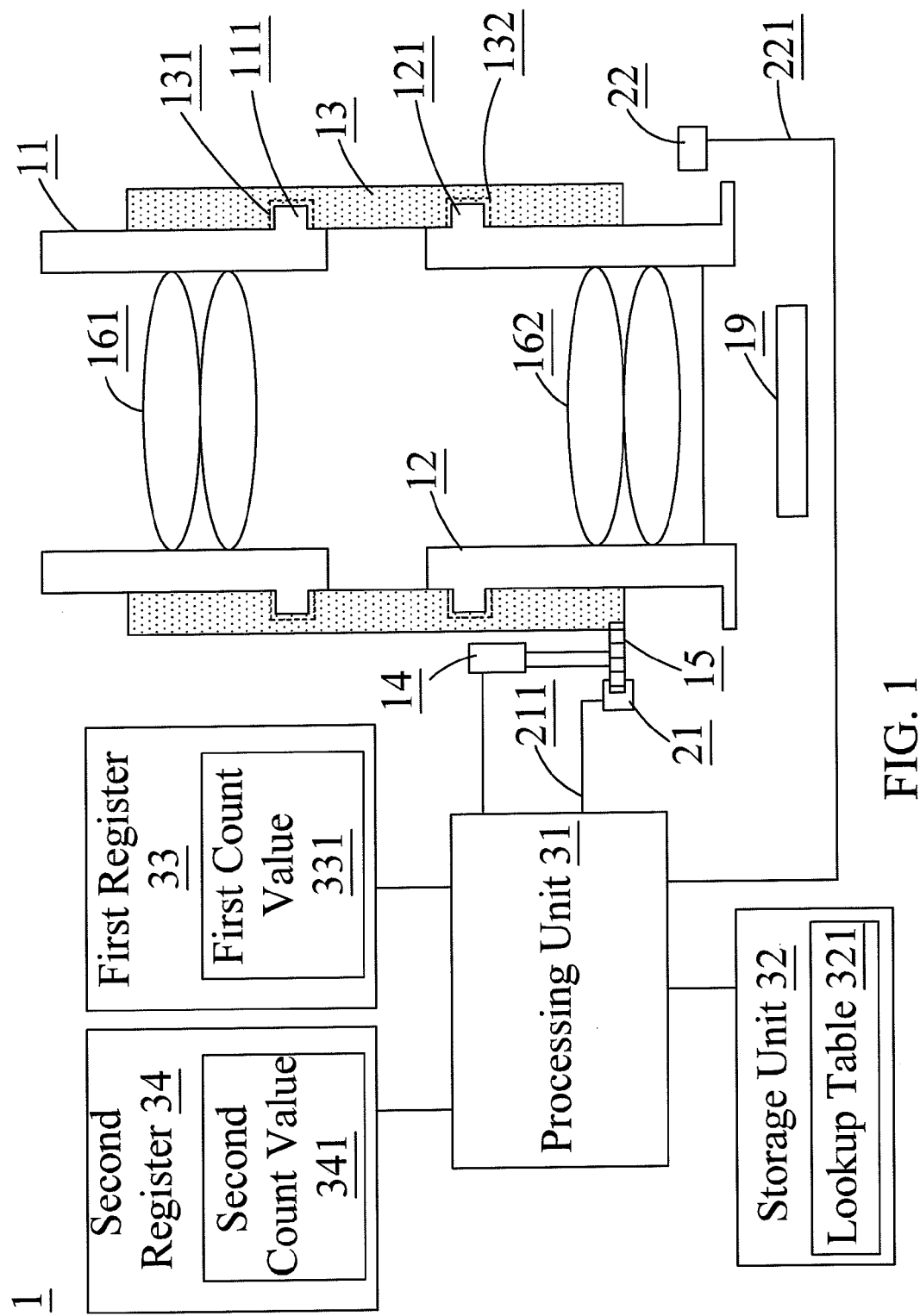
FIG. 1 illustrates schematic view of the barrel driving system in accordance with the present invention.

FIG. 1 illustrates a schematic view of the barrel driving system in accordance with the present invention. For explanation, a zooming lens structure with two barrels is described in FIG. 1, but not limited. The zooming lens barrel structure with three barrels can also be applied in the present invention. The barrel driving system 1 comprises a driving module, a zooming barrel 11, a first position detection unit 21, a first register 33, a second position detection unit 22, a second register 34, a focusing barrel 12, a storage unit 32, a processing unit 31 and an image sensor 19. In FIG. 1, the driving module comprises a driving barrel 13, a motor 14 and a gear 15.

The zooming barrel 11, the focusing barrel 12 and the driving barrel 13 have hollow cylinder structures. A first guiding groove 131 and a second guiding groove 132 are arranged in the inner wall of the driving barrel 13. A first guiding protrusion 111 and a second guiding protrusion 121 are arranged in the outer wall of the zooming barrel 11 and the outer wall of the focusing barrel 12 respectively. In FIG. 1, the zooming barrel 11 and the focusing barrel 12 are inserted and arranged inside the driving barrel 13, and the first guiding protrusion 111 and the second guiding protrusion 121 are placed in the first guiding groove 131 and the second guiding groove 132 respectively. Generally, the contact of these guiding protrusions and guiding grooves is not tight fit, and backlashes exist between the guiding protrusion and the guiding groove to allow the guiding protrusion to smoothly move in the guiding groove. However, the scope of the present invention are not limited to the present embodiment, various barrel structures of zooming lens can also be applied in the present invention. For example, the guiding groove is arranged on the focusing barrel 12, and the guiding protrusion is arranged on the driving barrel 131 correspondingly. Besides, the zooming barrel 11 and the focusing barrel 12 are driven by multiple barrels, not a single barrel. The guiding groove can have a line shape, a curve shape or a combination thereof.

The operation of driving the zooming barrel 11 and the focusing barrel 12 is described in the following section. The processing unit 31 sends a control signal to the motor 14 to drive the rotation of motor 14, and further drive the gear 16 correspondingly. The teeth of gear 15 are engaged with the tooth structure (not illustrated in FIG. 1) arranged on the outer surface of the driving barrel 13 so that the driving barrel 13 is driven to rotate correspondingly while the gear 15 rotates. The first guiding protrusion 111 and the second guiding protrusion 121 are forced to move along the first guiding groove 131 and the second guiding groove 132 respectively while the driving barrel 13 rotates, so that the zooming barrel 11 and the focusing barrel 12 are driven to move along an optical axis. A zooming lens group 161 and a focusing lens group 162 are arranged in the zooming barrel 11 and the focusing barrel 12 respectively, so that the zooming operation and focusing operation can be performed through controlling the clockwise or counterclockwise rotation of the driving barrel 13 driven by the motor 14 to drive the zooming barrel 11 and the focusing barrel 12 to move forwardly or backwardly for changing the optical distance between the zooming lens group 161 and the focusing lens group 162.

For improving the accuracy of the zooming and focusing operation, it is preferably to obtain the actual position or moving distance of the zooming barrel 11 and the focusing barrel 12 during their movement, so that the processing unit 31 can send more correct instruction to the motor 14. Therefore, the first position detection unit 21 is used to detect the driving module, such as the rotation of the gear 15 shown in FIG. 1. Preferably, the first position detection unit 21 can be implemented by a photointerrupter (PI), such as a Zoom PI which is well known in the art. The first position detection unit 21 outputs a first detection signal 211. A first count value 331 is stored in the first register 33 according to the first detection signal 211. In implementation of counting, the first detection signal 211 is binary data, when the processing unit 31 receives the first detection signal 211 with value of 1, the processing unit 31 adds the first count value 331 stored in the first register 33 by one if the motor 14 is rotated clockwise; otherwise, the processing unit 31 subtract the first count value 331 stored in the first register 33 by one if the motor 14 is rotated counterclockwise, so that the first register 33 can store the first count value 331 according to the first detection signal 211.

In the preferred embodiment, it is assumed that the clockwise rotation of the motor 14 makes the zooming barrel 11 moves forward as the distance between the zooming lens group 161 and the image sensor 19 increases. The first position detection unit 21 continues to output a binary data while the gear 15 is rotating so that the first count value 331 stored in the first register 33 increases. Therefore, the change of the first count value 331 is relative to the change of the distance between the zooming lens group 161 and the image sensor 19 so that the position of the barrel can be derived from the first count value 331. However, the relation between the actual position and the first count value 331 may be distorted due to the existence of the backlash while the frequent movements of the barrels. The more frequently the barrels move, the more greatly the distortion becomes. Thus, we need the second position detection unit 22 to correct the effect of backlash.

In the preferred embodiment, the zooming barrel 11 and the focusing barrel 12 is driven to move only by a single motor 14. The movement of the zooming barrel 11 corresponds to that of the focusing barrel 12 according to the well design of guiding groove and guiding protrusion. Preferably, the movements of the zooming barrel 11 and the focusing barrel 12 has a linear relation. During the zooming operation, the zooming barrel 11 has at least three particular positions comprising an initial position, a first zooming position and a second zooming position. When the zooming barrel 11 located at the first zooming position or the second zooming position, it means the first zooming operation or second zooming operation is completed. Because of that the movement of the focusing barrel 12 depends on that of the zooming barrel 11, when the zooming barrel 11 moves from the initial position to the first zooming position or from the first zooming position to the second zooming position, the focusing barrel 12 moves correspondingly and further triggers the second position detection unit 22 to generate a second detection signal 221. A second count value 341 is stored in the second register 34 according to the second detection signal 221, which is a binary data. The counting process of the second count value 341 is the same as the first count value 331, thus their detailed description will be omitted.

The storage unit 32 stores a lookup table 321 which records multiple predetermined values and multiple second count values 341 corresponding to the predetermined values. For example, the second count value 341 with a value of 1 corresponds to the predetermined value with a value of 0, and the second count value 341 with a value of 3 corresponds to the predetermined value with a value of 500.

When the second position detection unit 22 is triggered, the processing unit 31 receives the second detection signal 221 and updates the second count value 341, and access to the storage unit 32 to read the predetermined value corresponding to the updated second count value 341. The processing unit 31 then writes the predetermined value to the first register 33 to replace the original first count value 331 stored in the first register 33. For example, before the lens module is out of factory, the designer has tested the lens module to record the first count value 331 outputted from the second position detection unit 22 triggered by the corresponding movements of the focusing barrel 12 according to the position change of the zooming barrel 11 from the initial position to the first zooming position. The recorded first count value 331 is the predetermined value stored in the lookup table 321. Therefore, the backlash affects the association between the first count value 331 and the position of lens barrel. However, the error can be corrected by replacing the first count value 331 currently stored in the first register 33 with the predetermined value of the lookup table 321 when the second position detection unit 22 is triggered by the focusing barrel 12, so that the association between the first count value 331 and the position of lens barrel can be recovered to achieve the purpose of correcting backlash.

In other embodiment, the zooming barrel 11 can further move to a third zooming position. While the zooming barrel 11 moves from the second zooming position to the third zooming position, the focusing barrel 12 also moves correspondingly and triggers the second position detection unit 22 to generate the second detection signal 221 during the corresponding movements. After receiving the second detection signal 221, the processing unit 31 performs the above-mentioned counting operation and backlash correction operation by writing the predetermined value of lookup table 321 into the first register 33. In the embodiment, the first zooming position can be a wide-zooming position, the second zooming position can be a middle-zooming position, and the third zooming position can be a TELE-zooming position, preferably.

Preferably, the location where the focusing barrel 12 triggers the second position detection unit 22 may be between a zooming completion position and a focusing starting position. Preferably, the first position detection unit 21 can be a zoom photointerrupter (PI), and the second position detection unit 22 can be a home PI. These two PIs are well known and broadly used in the art.

Figure 2:
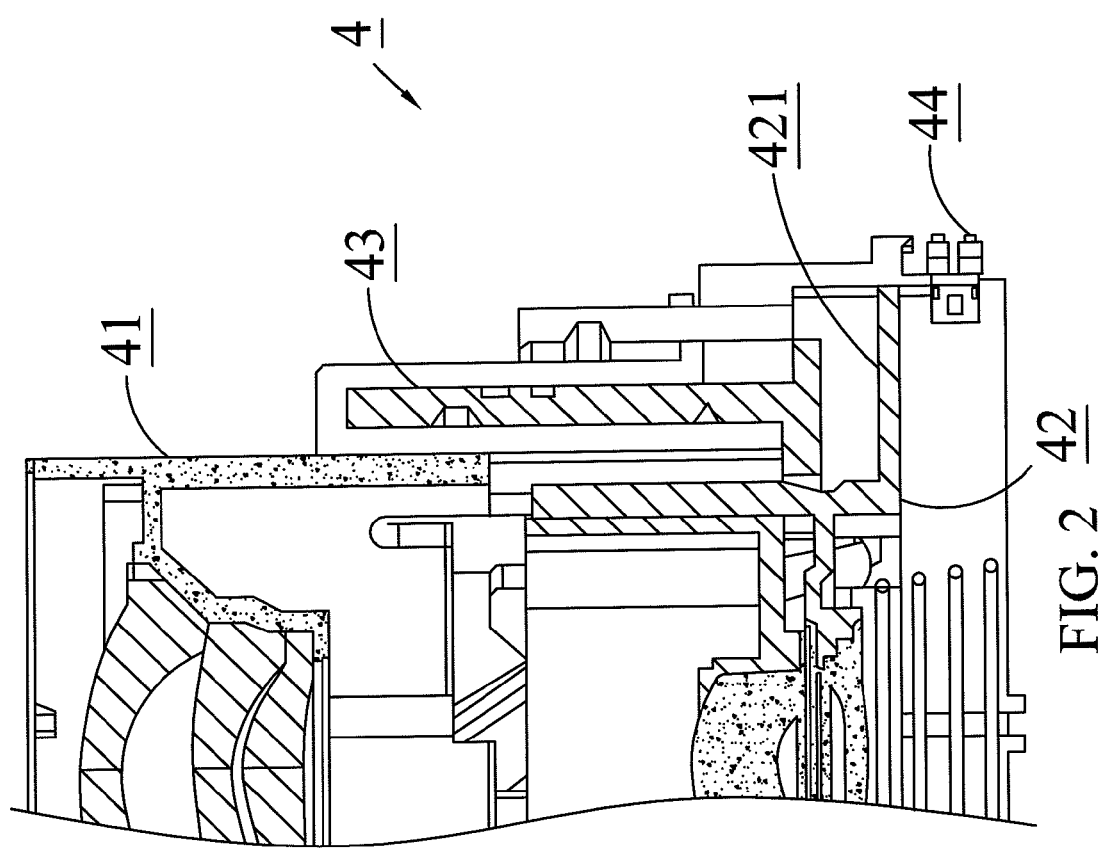
FIG. 2 illustrates a schematic view of the structure of an embodiment of barrel driving system in accordance with the present invention.
Figure 3:
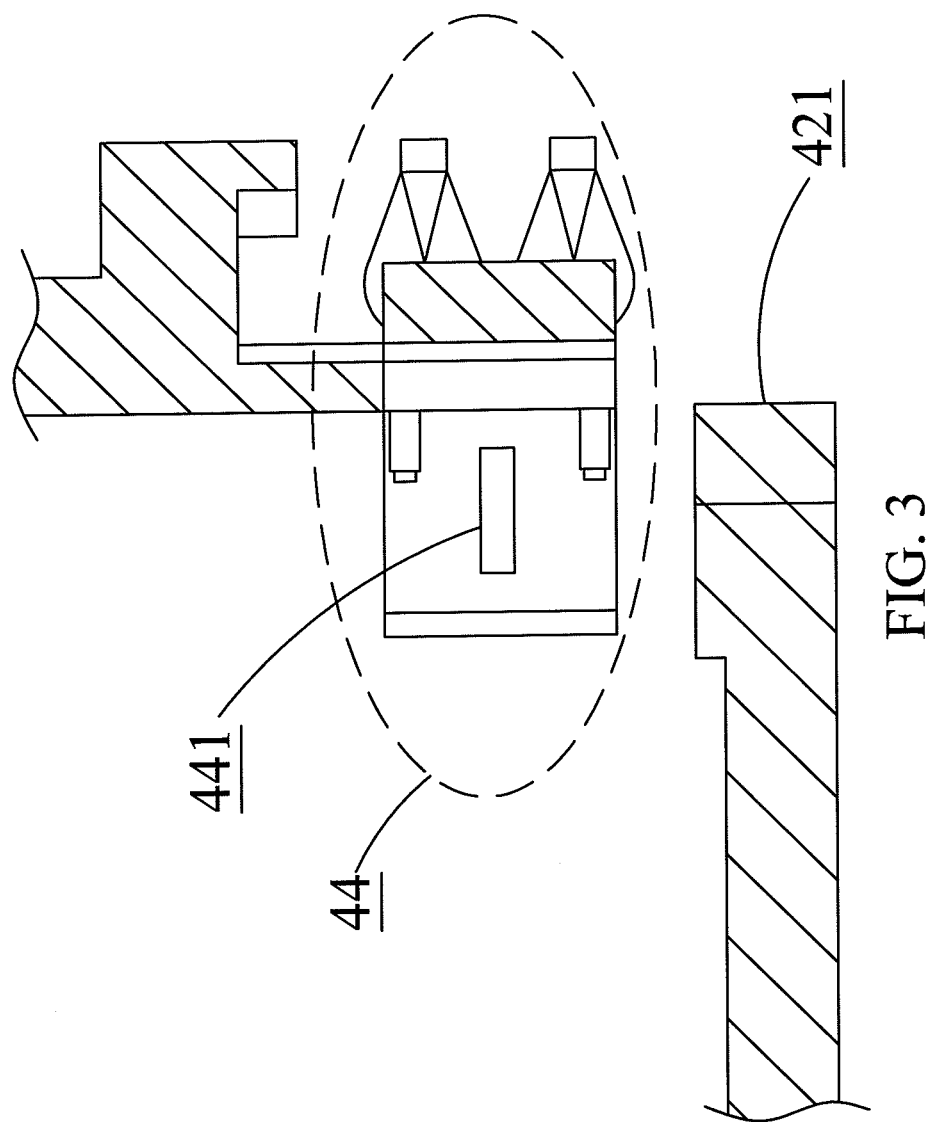
FIGS. 3 to 6 illustrates schematic views of relative positions between the home PI and the focusing barrel according to the focusing position corresponding to the zooming barrel in accordance with the present invention.
Figure 4:
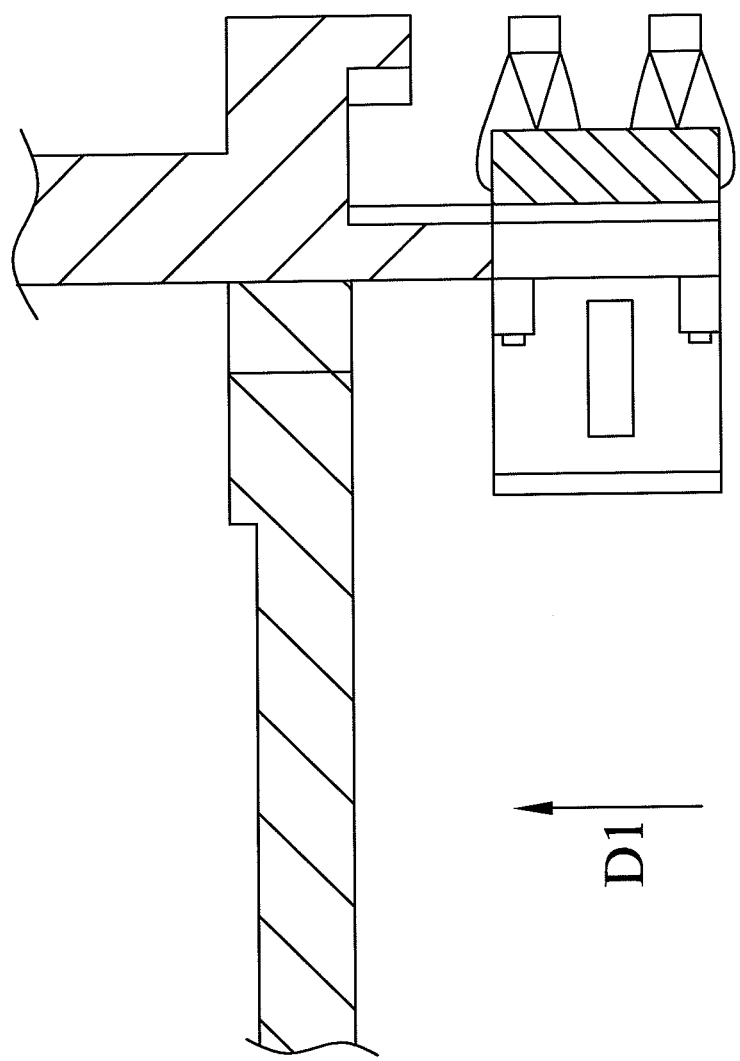
Figure 5:
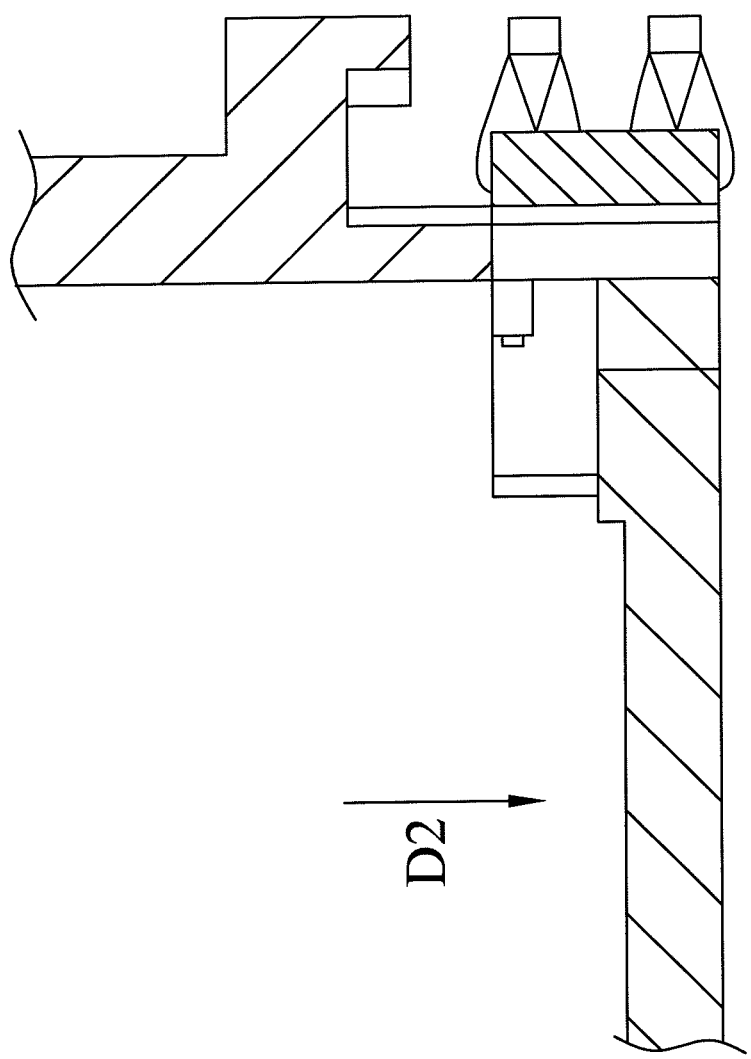
Figure 6:
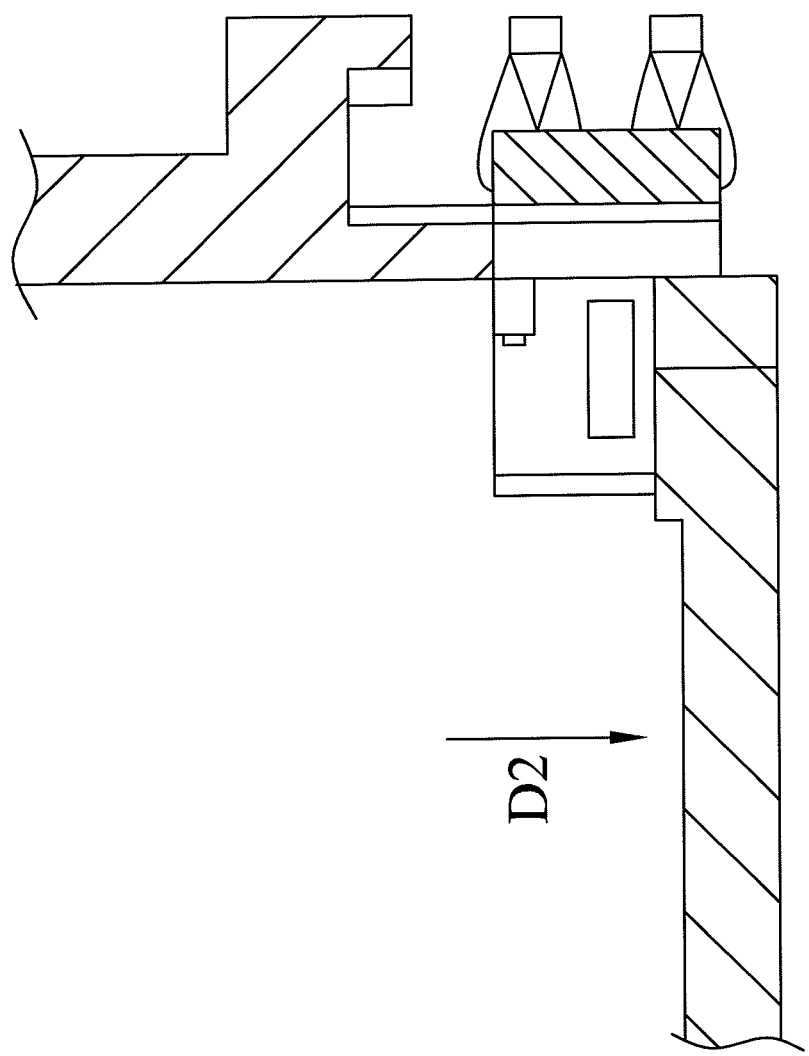

FIG. 2 illustrates a schematic view of the structure of an embodiment of barrel driving system in accordance with the present invention, and FIGS. 3 to 6 illustrates the schematic views of relative positions between the home PI and the focusing barrel according to the focusing position corresponding to the zooming barrel in accordance with the present invention. For easier explanation, only a zooming barrel 41, a focusing barrel 42, a driving barrel 43 and a home PI 44 of lens module 4 are shown in FIG. 2. A protrusive plate 421 extended from the focusing barrel 42 is designed to pass the detecting area 441 of the home PI 44 (as shown in FIG. 3) during the movement of the focusing barrel 42, so that the home PI 44 is then triggered to generate and output a signal. The processing unit (not shown in FIG. 2) is electrically connected with the home PI 44 to receive the output signal from the home PI 44, and store a second count value in the second register according to the output signal. Preferably, the processing unit can be a microprocessor. In addition, the lens module 4 also comprises a zoom PI and a first register corresponding to the zoom PI, their functions are explained in the above-mentioned section and thus their detailed description will be omitted.

Please refer to FIG. 3, when the zooming barrel 41 is located at the initial position, the protrusive plate 421 of the focusing barrel 42 is located correspondingly below the home PI 44. Please refer to FIG. 4, when the zooming barrel 41 moves from the initial position to the WIDE position in direction D, the protrusive plate 421 of the focusing barrel 42 is correspondingly moved to the above of the home PI 44, and triggers the home PI 44 to generate two signal transitions comprising transition from 0 to 1 and from 1 to 0 in the output signal. The operational characteristic of PI is well known in the art, and thus the detailed description will be omitted.

When the protrusive plate 421 blocks the detecting area 441 of the home PI 44, the status of the output signal of the home PI 44 is changed from 0 to 1, and the processing unit correspondingly updates the second count value stored in the second register to 1. When the protrusive plate 421 continues to move to the location that does not block the detecting area 441 of the home PI 44, the status of the output signal of the home PI 44 is changed from 1 to 0, and the processing unit correspondingly updates the second count value stored in the second register to 2. Please refer to FIG. 5, when the zooming barrel 41 moves from the WIDE position to a MID position in direction D2, the protrusive plate 421 is correspondingly moved to block the detecting area 441 of the home PI 44, and the status of the output signal of the home PI 44 is changed from 0 to 1, and the second count value is updated to 3. Please refer to FIG. 6, when the zooming barrel 41 moves from the MID position to a TELE position in direction D2, the protrusive plate 421 leaved the detecting area 441 of the home PI 44, so that the status of the output signal of the home PI 44 is changed from 1 to 0, and the second count value is updated to 4.

In the embodiment, a lookup table recording the predetermined values corresponding to the second count values is provided. Please refer to table 1, the second count values "1"

and "2" correspond to the predetermined value "0", and the second count values "3" corresponds to the predetermined value "500", and the second count values "4" corresponds to the predetermined value "700". When the lens module 4 is operated, the processing unit searches a corresponding predetermined value as long as the output signal of the home PI 44 is changed. The first count value stored in the first register is further replaced with the searched predetermined value so as to correct the error caused by backlash.

TABLE 1

| second count value | predetermined value |
|---|---|
| 1, 2 | 0 |
| 3 | 500 |
| 4 | 700 |

Figure 7:
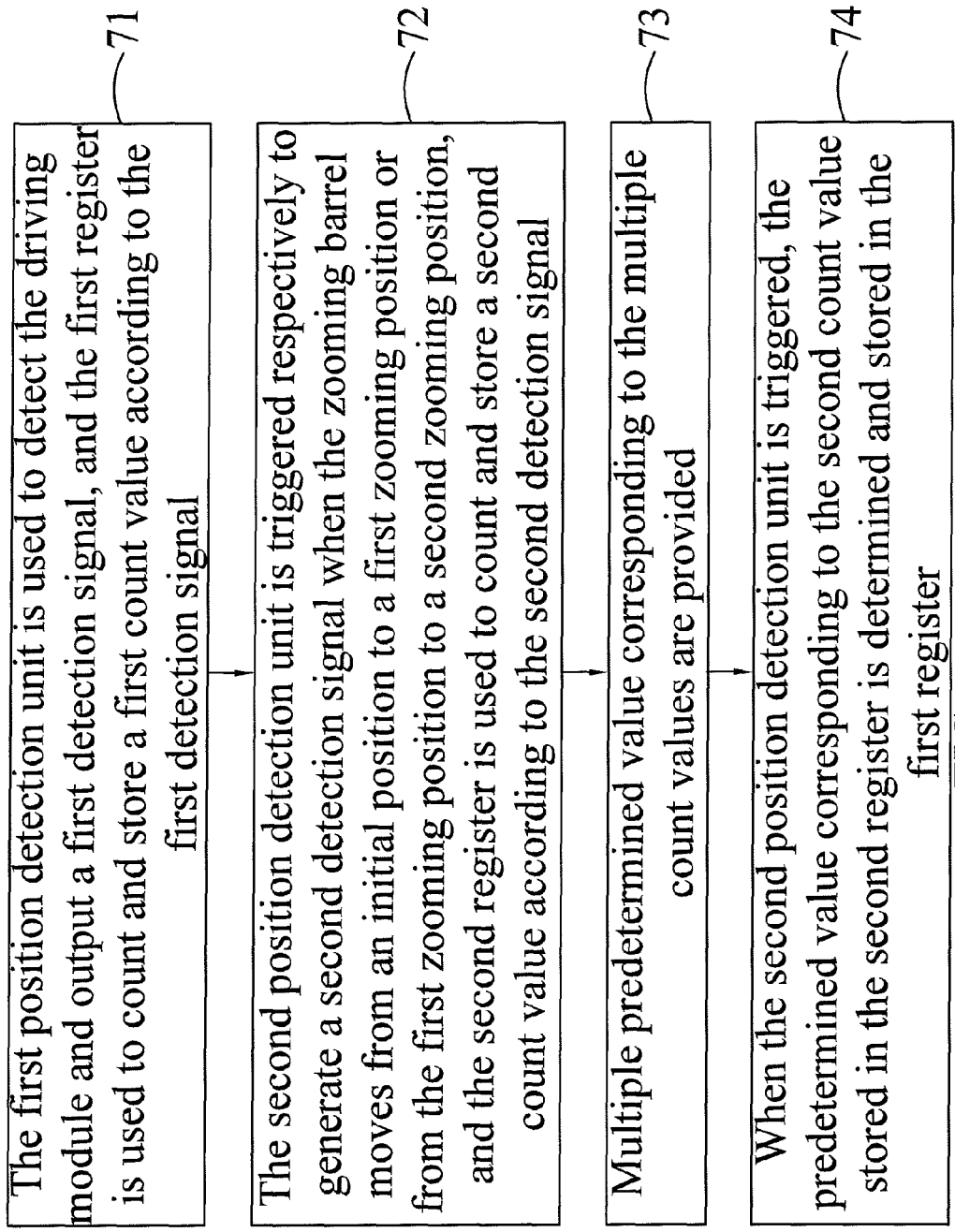
FIG. 7 illustrates a flow chart of backlash correction method in accordance with the present invention.

FIG. 7 illustrates a flow chart of backlash correction method in accordance with the present invention. In the embodiment, the backlash correction method is applied to the barrel driving system shown in FIG. 1, and comprises the following steps. In step 71, the first position detection unit is used to detect the driving module and output a first detection signal. The first register is used to count and store a first count value according to the first detection signal. The first count value is relevant to the movement of the zooming barrel.

In step 72, a second position detection unit is provided. The second position detection unit is triggered to generate a second detection signal when the zooming barrel moves from an initial position to a first zooming position or from the first zooming position to a second zooming position respectively. Preferably, the first zooming position is a WIDE position, and the second zooming position is a MID position. The second register is used to count and store a second count value according to the second detection signal.

In step 73, multiple predetermined values corresponding to multiple count values are provided, such as Table 1.

In step 74, when the second position detection unit is triggered, the predetermined value corresponding to the second count value stored in the second register is determined and stored in the first register to replace the original first count value stored in the first register.

Thus, specific embodiments and applications of barrel driving system and backlash correction method thereof have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. In addition, where the specification and claims refer to at least one of something selected from the group consisting of A, B, C . . . and N, the text should be interpreted as requiring only one element from the group, not A plus N, or B plus N, etc.

What is claimed is:

1. A barrel driving system, comprising:
 a driving module;
 a zooming barrel, being controlled by the driving module to move to an initial position, a first zooming position or a second zooming position;
 a first position detection unit, detecting the driving module and outputting a first detection signal;
 a first register, storing a first count value according to the first detection signal;
 a second position detection unit;
 a focusing barrel, moving by being controlled through the driving module, wherein the focusing barrel is moved correspondingly to the zooming barrel so that the focusing barrel moves to triggers the second position detection unit to generate a second detection signal when the zooming barrel moves from the initial position to the first zooming position or from the first zooming position to the second zooming position respectively;
 a second register, storing a second count value according to the second detection signal;
 a storage unit, storing a lookup table which records multiple predetermined values and the second count values corresponding to the multiple predetermined values; and
 a processing unit, wherein when the second position detection unit is triggered, the processing unit reads the predetermined value corresponding to the second count value from the storage unit, and stores the predetermined value in the first register to replace the first count value stored in the first register.

2. The barrel driving system of claim 1, wherein the zooming barrel further moves to a third zooming position, and the focusing barrel moves correspondingly to triggers the second position detection unit to generate the second detection signal when the zooming barrel moves from the second zooming position to the third zooming position.

3. The barrel driving system of claim 2, wherein the first zooming position is a WIDE position, the second zooming position is a MID position, and the third zooming position is a TELE position.

4. The barrel driving system of claim 1, wherein the position where the focusing barrel triggers the second position detection unit is between a zooming completion position and a focusing starting position.

5. The barrel driving system of claim 1, wherein the first position detection unit is a zoom PI, and the second position detection unit is a home PI.

6. The barrel driving system of claim 1, wherein the predetermined value, which is corresponding to the second detection signal outputted by the second position detection unit triggered while the zooming barrel moves from the initial position to the first zooming position, is 0.

7. A backlash correction method applied to a barrel driving system comprising a zooming barrel, a focusing barrel and a driving module controlling movements of the zooming barrel and the focusing barrel, and the zooming barrel being moved to an initial position, a first zooming position and a second zooming position; the movement of the focusing barrel being corresponding to the movement of the zooming barrel, the backlash correction method comprising following steps:

using a first position detection unit to detect the driving module for outputting a first detection signal, and using a first register to count and store a first count value according to the first detection signal;

using a second position detection unit to generate a second detection signal while the second position detection unit is triggered during the movement of the zooming barrel from the initial position to the first zooming position or from the first zooming position to the second zooming position respectively, and using a second register to count and store a second count value according to the second detection signal;

providing multiple predetermined values corresponding to the multiple second count values; and determining one of the predetermined values corresponding to the second count value when the second position detection unit is triggered, and storing the determined predetermined value in the first register to replace the first count value stored in the first register.

8. The backlash correction method of claim 7, wherein the zooming barrel further moves to a third zooming position, and the focusing barrel moves correspondingly to trigger the second position detection unit to generate the second detection signal when the zooming barrel moves from the second zooming position to the third zooming position.

9. The backlash correction method of claim 7, wherein the first zooming position is a WIDE position, the second zooming position is a MID position, and the third zooming position is a TELE position.

10. The backlash correction method of claim 7, wherein the position where the focusing barrel triggers the second position detection unit is between a zooming completion position and a focusing starting position.

* * * * *